United States Patent
Picard et al.

(10) Patent No.: US 12,287,511 B2
(45) Date of Patent: Apr. 29, 2025

(54) MANAGING CHARACTERIZATION OF OPTICAL COUPLERS IN AN INTEGRATED CIRCUIT

(71) Applicant: Ciena Corporation, Hanover, MD (US)

(72) Inventors: Marie-Josee Picard, L'Ancienne-Lorette (CA); Christine Latrasse, Quebec (CA)

(73) Assignee: Ciena Corporation, Hanover, MD (US)

( * ) Notice: Subject to any disclaimer, the term of this patent is extended or adjusted under 35 U.S.C. 154(b) by 373 days.

(21) Appl. No.: 17/752,388

(22) Filed: May 24, 2022

(65) Prior Publication Data

US 2023/0384520 A1    Nov. 30, 2023

(51) Int. Cl.
G02B 6/126    (2006.01)

(52) U.S. Cl.
CPC .................................... G02B 6/126 (2013.01)

(58) Field of Classification Search
CPC ...................................................... G02B 6/126
See application file for complete search history.

(56) References Cited

U.S. PATENT DOCUMENTS

| 7,853,156 | B2 * | 12/2010 | Grigoryan | H04B 10/63 398/155 |
| 7,853,157 | B2 * | 12/2010 | Grigoryan | H04B 10/60 398/155 |
| 9,647,426 | B1 * | 5/2017 | Fish | H01S 5/5009 |
| 2010/0296161 | A1 * | 11/2010 | Little | G02B 6/126 359/485.02 |
| 2012/0002971 | A1 * | 1/2012 | Doerr | G02B 6/30 398/115 |
| 2013/0223841 | A1 | 8/2013 | Lee | |
| 2018/0224605 | A1 * | 8/2018 | Painchaud | G02B 6/14 |
| 2021/0159659 | A1 | 5/2021 | Bandyopadhyay et al. | |
| 2022/0065743 | A1 | 3/2022 | Simard et al. | |

FOREIGN PATENT DOCUMENTS

| CN | 201032465 Y | * | 3/2008 |
| JP | H08122723 A | * | 5/1996 |
| JP | 2005533277 A | * | 11/2005 |

OTHER PUBLICATIONS

D. P. Nair, et al., "A Compact Low-Loss Broadband Polarization Independent Silicon 50/50 Splitter," IEEE Photonics Journal, vol. 13, No. 4, Aug. 2021, 7 pgs.

* cited by examiner

*Primary Examiner* — Chris H Chu
(74) *Attorney, Agent, or Firm* — Young Basile Hanlon & MacFarlane, P.C.

(57) ABSTRACT

An integrated circuit can include one or more photonic layers that include a plurality of photonic integrated circuit portions. A first optical coupler is configured to couple an optical mode of an optical wave to a first photonic integrated circuit portion in the one or more photonic layers. A second optical coupler is configured to couple an optical mode of an optical wave to a second photonic integrated circuit portion that is optically uncoupled to the first photonic integrated circuit portion. The second photonic integrated circuit portion comprises a polarization-sensitive photonic component, and an optical splitter comprising at least one input port optically coupled to the polarization-sensitive photonic component and at least two output ports including a first output port and a second output port.

10 Claims, 10 Drawing Sheets

MANAGING CHARACTERIZATION OF OPTICAL COUPLERS IN AN INTEGRATED CIRCUIT

TECHNICAL FIELD

This disclosure relates to managing characterization of optical couplers in an integrated circuit.

BACKGROUND

Integrated circuits, such as photonic integrated circuits (PICs), or electronic integrated circuits (EICs) that incorporate portions of photonic integrated circuits, may include a variety of photonic devices and optical waveguides for transporting optical waves around into and out of such devices (e.g., splitters, modulators, interferometers, resonators, multimode interference (MMI) couplers, photodetectors, etc.). A waveguide is a structure that confines and guides the propagation of an electromagnetic wave. Some electromagnetic waves have a spectrum that has a peak wavelength that falls in a particular range of optical wavelengths (e.g., between about 100 nm to about 1 mm, or some subrange thereof), also referred to as "optical waves," "light waves," or simply "light," and waveguides for light will be referred to herein as "optical waveguides". These optical waveguides may be implemented, for example, by forming a core structure from a material having a higher refractive index (e.g., silicon, or silicon nitride) surrounded by a cladding (also called a "buffer") comprising one or more materials (or air) that have a lower refractive index. In some cases, there may be losses associated with coupling light into or out of optical waveguides using optical couplers in the integrated circuit, and in some cases such losses may not be accurately known.

SUMMARY

In one aspect, in general, an integrated circuit comprises: one or more photonic layers that include a plurality of photonic integrated circuit portions; a first optical coupler configured to couple an optical mode of an optical wave to a first photonic integrated circuit portion in the one or more photonic layers; a second optical coupler configured to couple an optical mode of an optical wave to a second photonic integrated circuit portion that is optically uncoupled to the first photonic integrated circuit portion, the second photonic integrated circuit portion comprising a polarization-sensitive photonic component, and an optical splitter comprising at least one input port optically coupled to the polarization-sensitive photonic component and at least two output ports including a first output port and a second output port.

Aspects can include one or more of the following features.

The first output port and the second output port are optically coupled to each other.

The second photonic integrated circuit portion comprises a loop reflector that comprises the optical splitter and an optical waveguide that has a first end abutted against the first output port and a second end abutted against the second output port.

The polarization-sensitive photonic component comprises an optical waveguide configured to support a first mode that has a first effective refractive index for a transverse electric polarization and a second mode that has a second effective refractive index for a transverse magnetic polarization, and where the second effective refractive index is different from the first effective refractive index.

The polarization-sensitive photonic component comprises a polarization rotator splitter (PRS) that comprises a PRS input port optically coupled to the second optical coupler, and a first PRS output port coupled to the input port of the optical splitter.

The PRS is configured to support a first mode at the PRS input port that has a transverse magnetic (TM) polarization and a second mode at the first PRS output port that has a transverse electric (TE) polarization, and the PRS is configured to propagate over 90% of energy in the first mode at the PRS input port to the first PRS output port.

The PRS comprises a second PRS output port output port and is configured to support a third mode at the PRS input port that has a TE polarization and a fourth mode at the second PRS output port that has a TE polarization, and the PRS is configured to propagate over 90% of energy in the third mode at the PRS input port to the second PRS output port.

The first PRS output port is coupled to the optical splitter that is part of a first loop reflector, and the second PRS output port is coupled to a second optical splitter that is part of a second loop reflector with a different optical path length from the PRS than the first loop reflector.

The first PRS output port is coupled over a first optical path length to a first input port of the optical splitter that is part of a loop reflector, and the second PRS output port is coupled over a second optical path length to a second input port of the optical splitter, and the first optical path length is different from the second optical path length.

The PRS is configured to support a first mode at the PRS input port that has a transverse electric (TE) polarization and a second mode at the first PRS output port that has a transverse electric (TE) polarization, and the PRS is configured to propagate over 90% of energy in the first mode at the PRS input port to the first PRS output port.

Each of the first optical coupler and the second optical coupler comprises spot-size converter configured to change a size of an optical mode of an optical wave propagating through the spot-size converter.

The first optical coupler and the second optical coupler are in the same photonic layer of the one or more photonic layers.

In another aspect, in general, a method for characterizing a first optical coupler in an integrated circuit that is optically coupled to a first integrated circuit portion comprises: coupling an optical mode of an input optical wave into a second optical coupler in the integrated circuit having an identical structure to the first optical coupler, where the second optical coupler is optically coupled to a second photonic integrated circuit portion and is optically uncoupled to the first photonic integrated circuit portion; propagating the input optical wave through a polarization-sensitive photonic component; after propagating through the polarization-sensitive photonic component, splitting the input optical wave into first and second separated optical waves; combining the first and second separated optical waves into a combined optical wave; and propagating the combined optical wave through the polarization-sensitive photonic component.

Aspects can include one or more of the following features.

The method further comprises interfering a portion of the combined optical wave after propagating through the polarization-sensitive photonic component with a portion of the input optical wave, and measuring an intensity of a resulting interference pattern while scanning a wavelength of the input optical wave.

The method further comprises determining a characteristic of the second optical coupler based at least in part on the measured intensity.

The characteristic comprises an optical loss associated with propagation through the second optical coupler.

In another aspect, in general, an integrated circuit comprises: one or more photonic layers that include a plurality of photonic integrated circuit portions; a first optical coupler configured to couple at least one optical mode of an optical wave to a first photonic integrated circuit portion in the one or more photonic layers; a second optical coupler configured to couple at least one optical mode of an optical wave to a second photonic integrated circuit portion that is optically uncoupled to the first photonic integrated circuit portion, the second photonic integrated circuit portion comprising an optical waveguide, and an optical component comprising at least one input port optically coupled to the optical waveguide and a polarization-sensitive portion.

Aspects can include one or more of the following features.

The optical component comprises an optical splitter, and the polarization-sensitive component comprises an optical waveguide that has a first end abutted against a first output port of the optical splitter and a second end abutted against a second output port of the optical splitter, and the optical waveguide has different optical path lengths for different polarization modes.

The optical waveguide comprises a polarization-sensitive optical waveguide that is configured to support a first mode that has a first effective refractive index for a transverse electric polarization and a second mode that has a second effective refractive index for a transverse magnetic polarization, and where the second effective refractive index is different from the first effective refractive index.

Each of the first optical coupler and the second optical coupler comprises spot-size converter configured to change a size of an optical mode of an optical wave propagating through the spot-size converter.

Aspects can have one or more of the following advantages.

Photonic integrated circuits can be implemented in a variety of platforms, such as a Silicon Photonics platform that are fabricated from using a silicon wafer. For example, the core structure of a waveguide may be formed by the silicon layer over a buried oxide (BOX) layer (e.g., silicon dioxide) of a substrate, such as a silicon-on-insulator (SOI) wafer, while the cladding would be formed by the oxide of the BOX layer and silicon dioxide deposited on top of the core structure. The cladding may in some examples be formed by a single lower-index material (or air), or by multiple different lower-index materials (or air). A wafer can be fabricated to provide multiple integrated circuits having the same design, where after a dicing step each will be contained on a separate chip (also called a "die"). There may be testing before the wafer is diced into multiple dies, and/or testing after the dies have been separated. In either case, light may need to be coupled into and out of the wafer or die to characterize photonic devices or perform other types of tests.

A variety of kinds of optical couplers can be used to couple light into and/or out of one or more photonic layers of a photonic integrated circuit. One kind of optical coupler is a spot-size converter (SSC) that is able to couple light from a waveguide in a die or wafer to another waveguide, such as an optical fiber in proximity to the edge of the die or wafer. The SSC may include a tapered portion or one or more transition structures that convert an optical mode of an optical wave guided within a core of the optical fiber to a smaller (or larger) optical mode of an optical wave guided within the waveguide in the die or wafer. The internal loss associated with propagating through these SSCs for optical modes of different polarizations, such as transverse-electric (TE) polarization modes and transverse-magnetic (TM) polarization modes, may be different. In some cases, it is useful to characterize these different losses for TE and TM polarized modes using wafer-level tests performed on the wafers. In some cases, the excess loss attributed to the mode mismatch between the SSC at die facet and an optical fiber is also characterized using die-level tests performed on the dies. Other kinds of optical couplers include edge couplers without spot size conversion, or grating couplers that couple an optical wave (using a grating) at a surface of a die or wafer instead of at an edge.

Some of the techniques described herein for managing characterization of optical couplers are able to avoid the need for special layouts that take a significant portion of the area on a wafer or die, and/or may not be compatible with production wafers or dies. For example, one way to characterize a specific design of a SSC is to use a passive circuit layout with two SSCs at opposite die edges to characterize the coupling loss through each SSC. Or, instead of such a face-to-face layout, there may be a layout with a 90-degree angle with SSCs on adjacent (i.e., perpendicular) edges, or a layout with a 180-degree turn with both input and output SSCs on the same die edge. In any of these examples, there may be a relatively large die area needed for the two SSCs and the waveguide between them. Such characterization circuits may therefore be incompatible with production die size requirements and layout requirements, such as the need for dicing lanes. Another approach would be to connect an SSC to an integrated photodiode, but testing with such a layout might call for a wirebond step and/or electrical probe adjustment. And, with an integrated photodiode, there may be an uncertainty in the photodiode response, leading to uncertainty in the measured loss. Also, photodiodes may not be available for some passive photonic integrated circuit designs.

Alternatively, some implementations of the techniques described herein have a smaller footprint that uses less of the area of a die or wafer. Also, some implementations may only need a single optical fiber to be aligned (e.g., instead of two optical fibers in some of these other approaches). The test portion of the integrated circuit that characterizes the optical coupler also only needs to include a single optical coupler at an edge of the die instead of requiring two optical couplers at input and output edges of the die. Thus, by removing the unknown effects of the second optical coupler, there is less uncertainty in the characterization of the single optical coupler. The test setup can also be less complex, and the time needed for testing can be reduced. The data that can be acquired from such tests characterizing the losses of SSCs or other optical couplers can allow for improved monitoring of any deviations during fabrication, and for characterization of the optical coupler losses directly, rather than only as part of overall circuit loss that may include other effects (e.g., photodiode responsivity).

Other features and advantages will become apparent from the following description, and from the figures and claims.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

An optical coupler characterization circuit can be used to characterize an optical coupler (e.g., a SSC optical coupler) that may have an associated optical loss that is unknown. So, it may be useful to perform loss characterization measurements when fabricating a wafer or die that includes any number of such optical couplers. On a given die or wafer it may be sufficient to test a select subset of the optical couplers (in some cases only one) because their optical loss characteristics will be substantially similar due to the consistency of the fabrication over that die or wafer.

One aspect of forming a compact optical coupler characterization circuit is being able to confine the light to a small portion of the die or wafer under test. Some implementations of an optical coupler characterization circuit include one or more integrated circuit retroreflectors that enable the light that enters the optical coupler under test to be sent back out of that same optical coupler in a compact arrangement. For example, one type of integrated circuit retroreflector is a loop reflector (sometimes also called a Sagnac loop reflector), which includes an optical splitter and a waveguide loop that couples two output ports of the optical splitter. Other examples of integrated circuit retroreflectors include mirror coating deposition on an etched surface at the end of a waveguide (e.g., the end of a waveguide reaching the side of the chip, or a surface of a cavity etched into a portion of the chip that contains a waveguide).

Figure 1A:
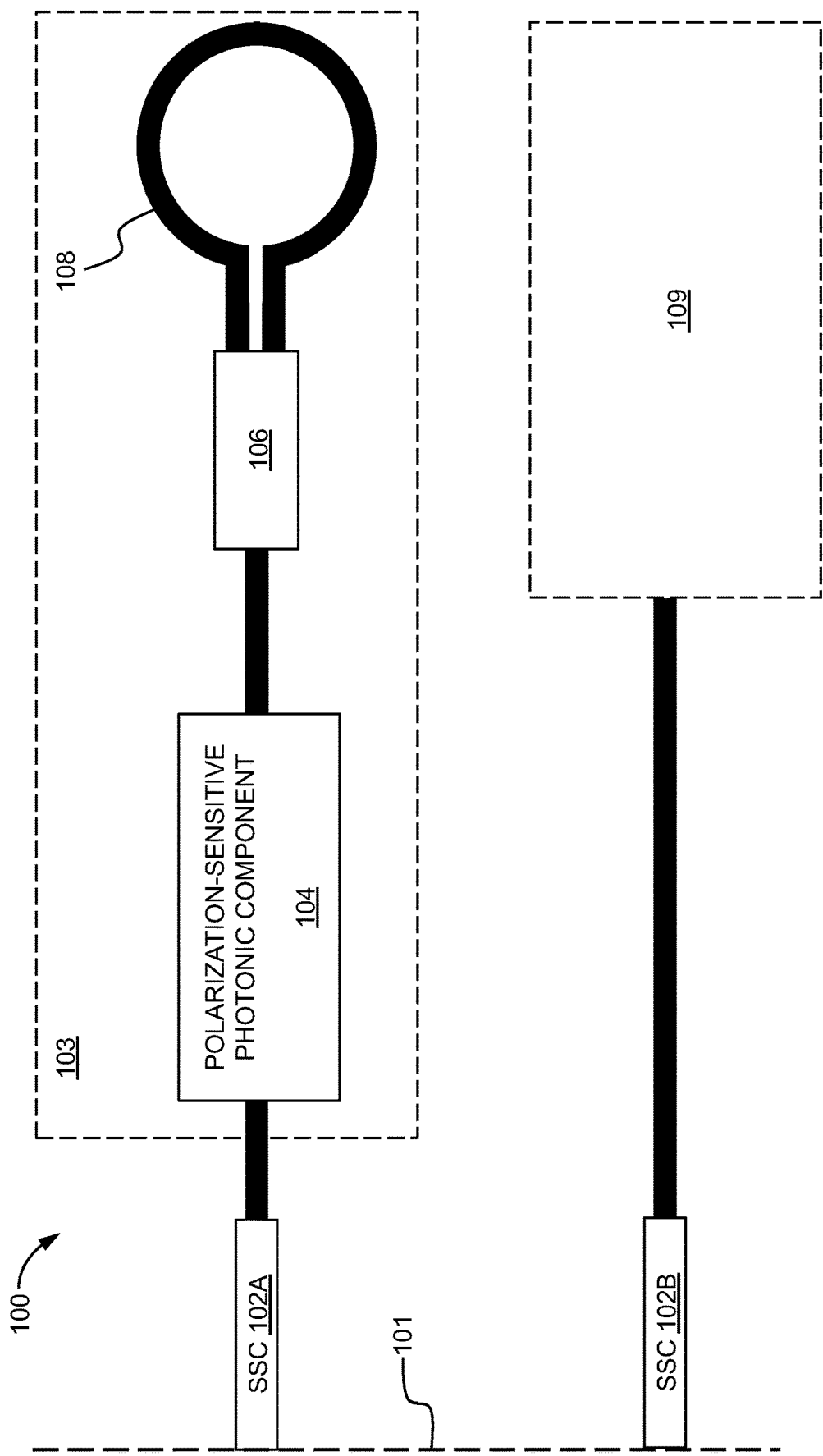
FIG. 1A is a schematic diagram of a testing circuit and an associated optical coupler.

Referring to FIG. 1A, a testing circuit 100 is located on an integrated circuit for characterizing optical coupling characteristics (e.g., optical loss) associated with a SSC 102A. In this example, the SSC 102 couples an optical wave at the edge 101 of the integrated circuit. Generally, any given integrated circuit may include one or more photonic layers that include various photonic integrated circuit portions that provide optical functionality within the integrated circuit. For example, another SSC 102B in this example is optically coupled by an optical waveguide to a photonic integrated circuit portion 109 that may be part of a production device. Each of the SSCs 102A and 102B are configured to couple an optical mode of an optical wave to different (optically uncoupled) portions of the integrated circuit. The purpose of the SSC 102A is for characterizing properties of both SSCs 102A and 102B, which are presumed to have similar properties. The SSC 102A is optically coupled to an optical coupler characterization circuit 103 that includes optical elements that allow a compact form factor. The optical coupler characterization circuit 103 includes a polarization-sensitive photonic component 104, and an optical splitter 106, which has an input port optically coupled to the polarization-sensitive photonic component 104 and two output ports that are optically coupled to each other via a waveguide loop 108. The waveguide loop 108 has a first end abutted against one output port and a second end abutted against the other output port. When the optical splitter 106 is configured to have low loss (e.g., less than 1% or less than 0.1%) and an even splitting ratio (e.g., with substantially 50% of the energy coupled to one output port and substantially 50% of the energy coupled to the other output port), together the optical splitter 106 and the waveguide loop 108 form a loop reflector. Because light is being retroreflected back into the optical splitter 106, the two ports connected to the waveguide loop 108 also serve as input ports, and the port at the other end also serves as an output port. Thus, the optical splitter 106 can also be described as an optical combiner when light propagates in the opposite direction through the optical splitter 106. One purpose of the polarization-sensitive photonic component 104 is to ensure that an optical wave has a predetermined polarization mode as it enters the optical splitter 106 so that the low loss and even splitting ratio characteristics can be well-defined for that intended polarization mode.

Figure 1B:
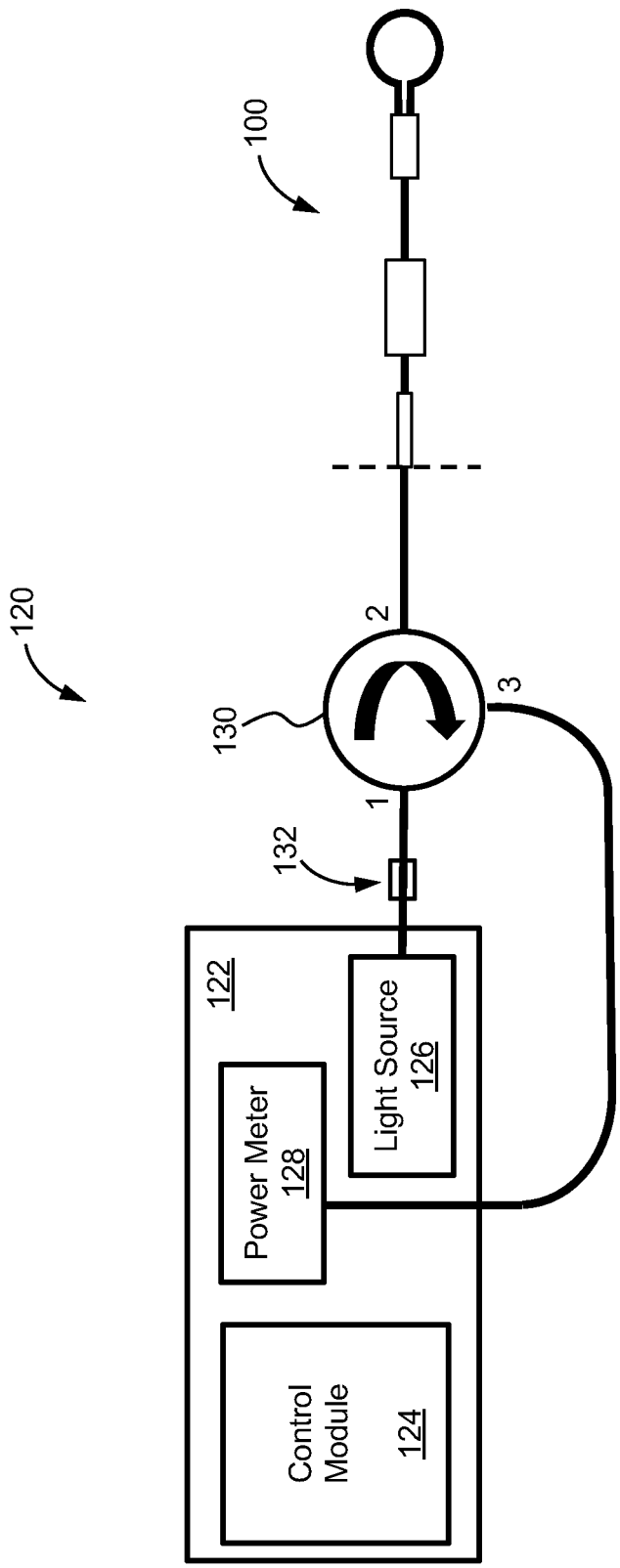
FIG. 1B is a schematic diagram of a testing system.

FIG. 1B shows an example of a testing system 120 that is able to perform various testing procedures on an integrated circuit (e.g., a die or an entire wafer) that includes a testing circuit 100. The testing system 120 includes an optical analyzer module 122 that has a control module 124 for controlling a light source 126 and a power meter 128. In a testing procedure, light is provided from the light source 126 to a port (1) of a 3-port fiber circulator 130, which circulates the light to a port (2) that is coupled to the testing circuit 100. Then light coming back from the testing circuit 100 is coupled back into the port (2) and circulated to another port (3) that provides light to the power meter 128. Thus, the optical analyzer module 122 is able to measure the reflected optical power and analyze the optical characteristics of the optical coupler within the testing circuit 100. In some implementations, a wavelength scan can be performed on the laser 126 to obtain a wavelength characterization of the optical coupler. For example, the light source 126 can be a tunable laser that provides coherent light with a wavelength that can be scanned over a predetermined range of wavelengths. Alternatively, when the optical analyzer module 122 is configured as an optical spectrum analyzer, a relatively broadband laser or other light source can be used to provide light that includes multiple wavelengths over a predetermined spectrum. In some optical couplers, the optical loss is polarization dependent. So, in this example, there is also a polarization controller 132 that manages polarization of the light within the testing system 120. In some testing procedures, different polarizations (e.g., TE and TM polarized modes) can be tested independently.

Figure 2:
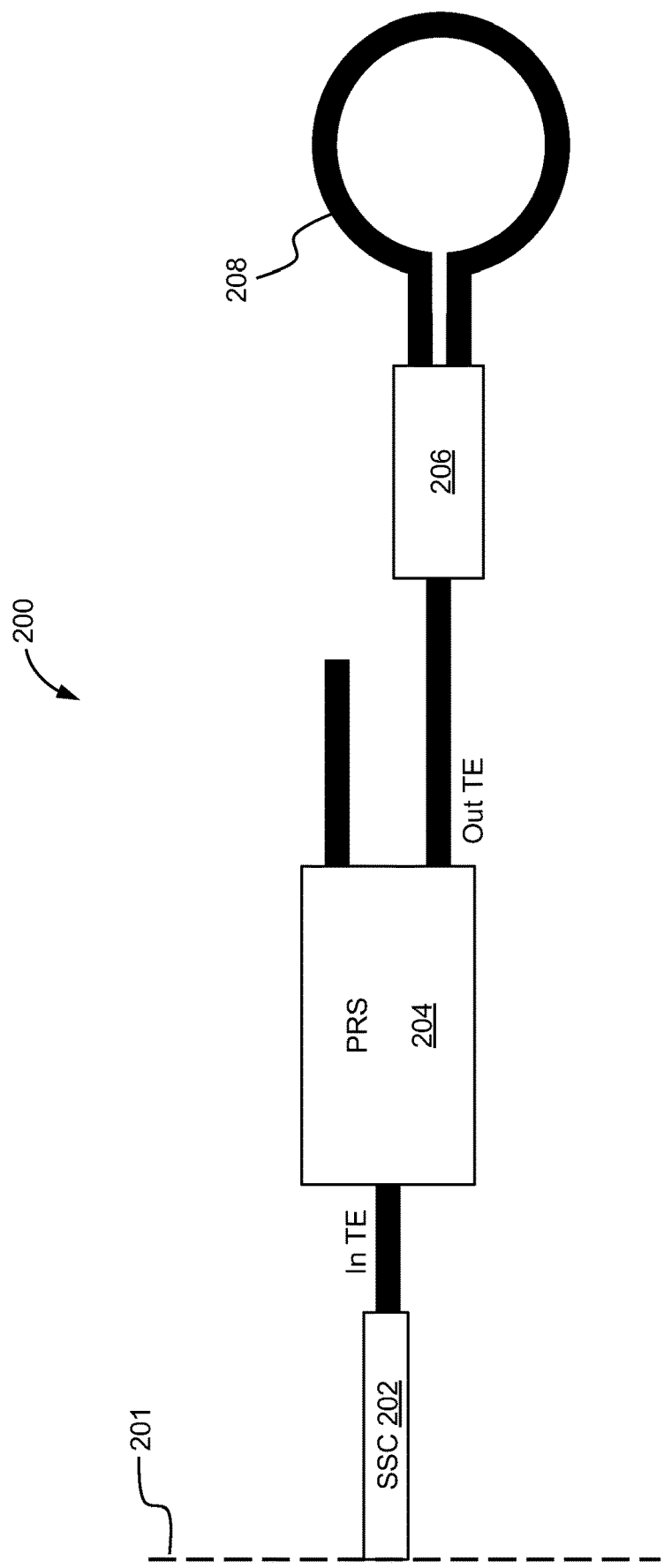
FIG. 2 is a schematic diagram of an example testing circuit.

Referring to FIG. 2, a testing circuit 200 is located on an integrated circuit for characterizing optical coupling characteristics (e.g., optical loss) associated with a SSC 202. In this example, the SSC 202 couples an optical wave at the edge 201 of the integrated circuit. The integrated circuit also has one or more other SSCs with identical structure (and thus will have similar properties) coupled to various photonic integrated circuit portions that are optically uncoupled to the testing circuit 200, whose characteristics will be measured using the testing circuit 200. There may be relatively small variations in the structure due to fabrication imperfections. The testing circuit 200 includes a polarization rotator splitter (PRS) 204, an example of the polarization-sensitive photonic component 104, which functions to take an input optical wave with an arbitrary polarization and split two predefined orthogonal polarizations (e.g., TM and TE) of the input optical wave and direct them to different output ports. The PRS 204 is also configured to rotate one of the polarizations so that both output optical waves have the same polarization. The testing circuit 200 also includes an optical splitter 206, which has an input port optically coupled to one of the output ports of the PRS 204 and two output ports that are optically coupled to each other via a waveguide loop 208. The waveguide loop 208 has a first end abutted against one output port and a second end abutted against the other output port. In this example, the testing circuit 200 is configured to enable characterization of the SSC 202 for a predetermined polarization, in this case for an input optical wave having a TE polarization mode.

Figure 3:
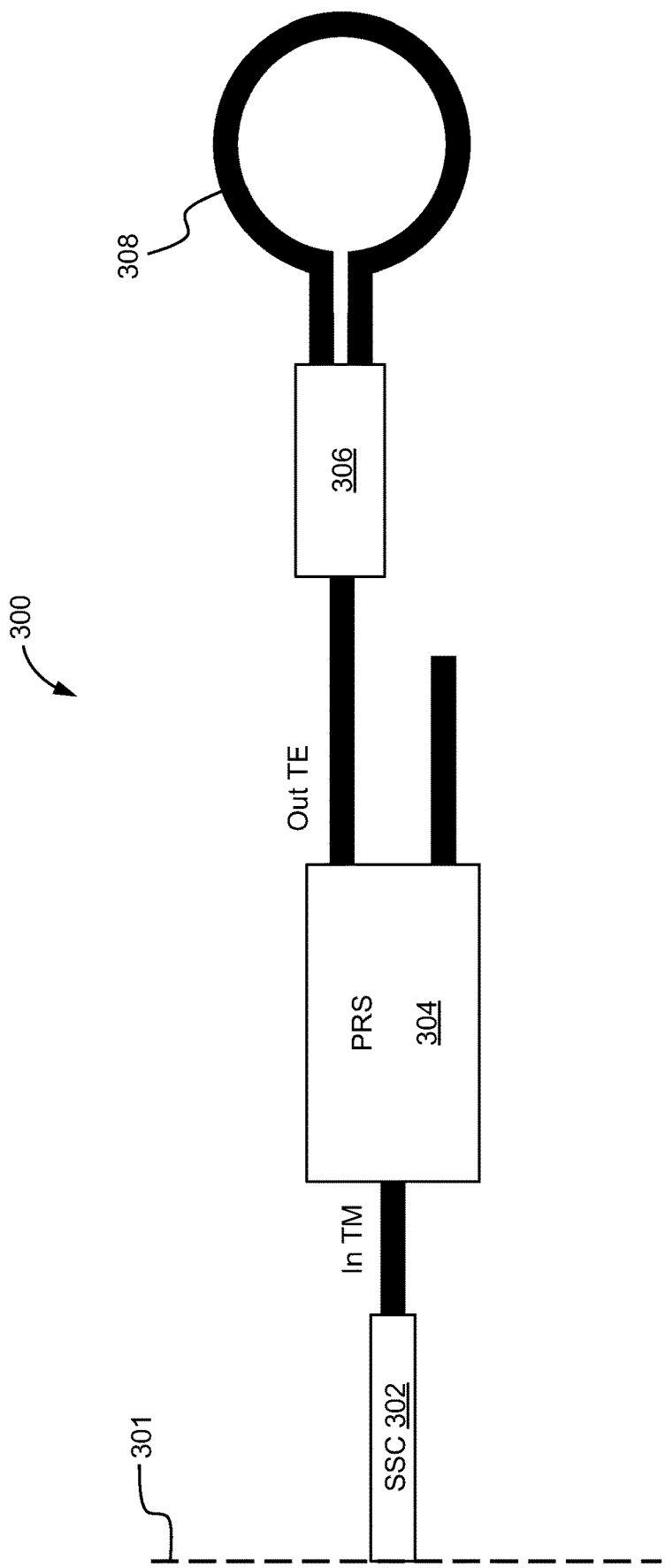
FIG. 3 is a schematic diagram of an example testing circuit.

Referring to FIG. 3, a testing circuit 300 is located on an integrated circuit for characterizing optical coupling characteristics (e.g., optical loss) associated with a SSC 302. In this example, the SSC 302 couples an optical wave at the edge 301 of the integrated circuit. The testing circuit 300 includes a polarization rotator splitter (PRS) 304. In this example, a TM polarization mode at the input port of the PRS 304 is converted into a TE polarization mode at the coupled output port of the PRS 304. The testing circuit 300 also includes an optical splitter 306, which has an input port optically coupled to one of the output ports of the PRS 304 and two output ports that are optically coupled to each other via a waveguide loop 308. The waveguide loop 308 has a first end abutted against one output port and a second end abutted against the other output port. In this example, the testing circuit 300 is configured to enable characterization of the SSC 302 for a predetermined polarization, in this case for an input optical wave having a TM polarization mode.

In the examples of FIGS. 2 and 3, there is one testing circuit 200 that is configured for characterizing the SSC 202 for a TE polarized mode of an input optical wave and another testing circuit 300 that is configured for characterizing the SSC 302 for a TM polarized mode of an input optical wave. During testing, the amount of energy in each of the two polarization modes may not be perfectly controllable. So, the polarization sensitivity provided by the PRS 204 and the PRS 304 ensures that the measurements performed will correspond to the intended polarization mode. Any deviations in the intended input polarization mode would cause light in the other polarization mode to be routed to the output port of the PRS that is left uncoupled (as shown in these examples by the optical waveguide portions that are not connected to anything) resulting in a loss of reflected power. In some implementations, an uncoupled waveguide at an output port is terminated with an optical absorber to ensure that no light is reflected back into the PRS. In other implementations an uncoupled waveguide at an output port can simply be left unterminated. Or, an output port can be terminated with an optical absorber, or left unterminated, without any portion of a waveguide being present at the output port. By minimizing this loss associated with such a deviation in the intended input polarization mode, the input optical wave can be tuned to achieve the intended polarization mode. If the polarization mode of the input optical wave is able to be controlled to a high degree of accuracy, an alternative design for the testing circuit 200 could remove the PRS 204 and directly couple the SSC 202 to the optical splitter 206. Likewise, an alternative design for the testing circuit 300 could remove the PRS 304 and replace it with a polarization rotator that converts the TM polarization mode to a TE polarization mode. Or, instead of inserting a polarization rotator, the optical splitter 306 and waveguide loop 308 could be configured for the TM polarization mode.

Figure 4:
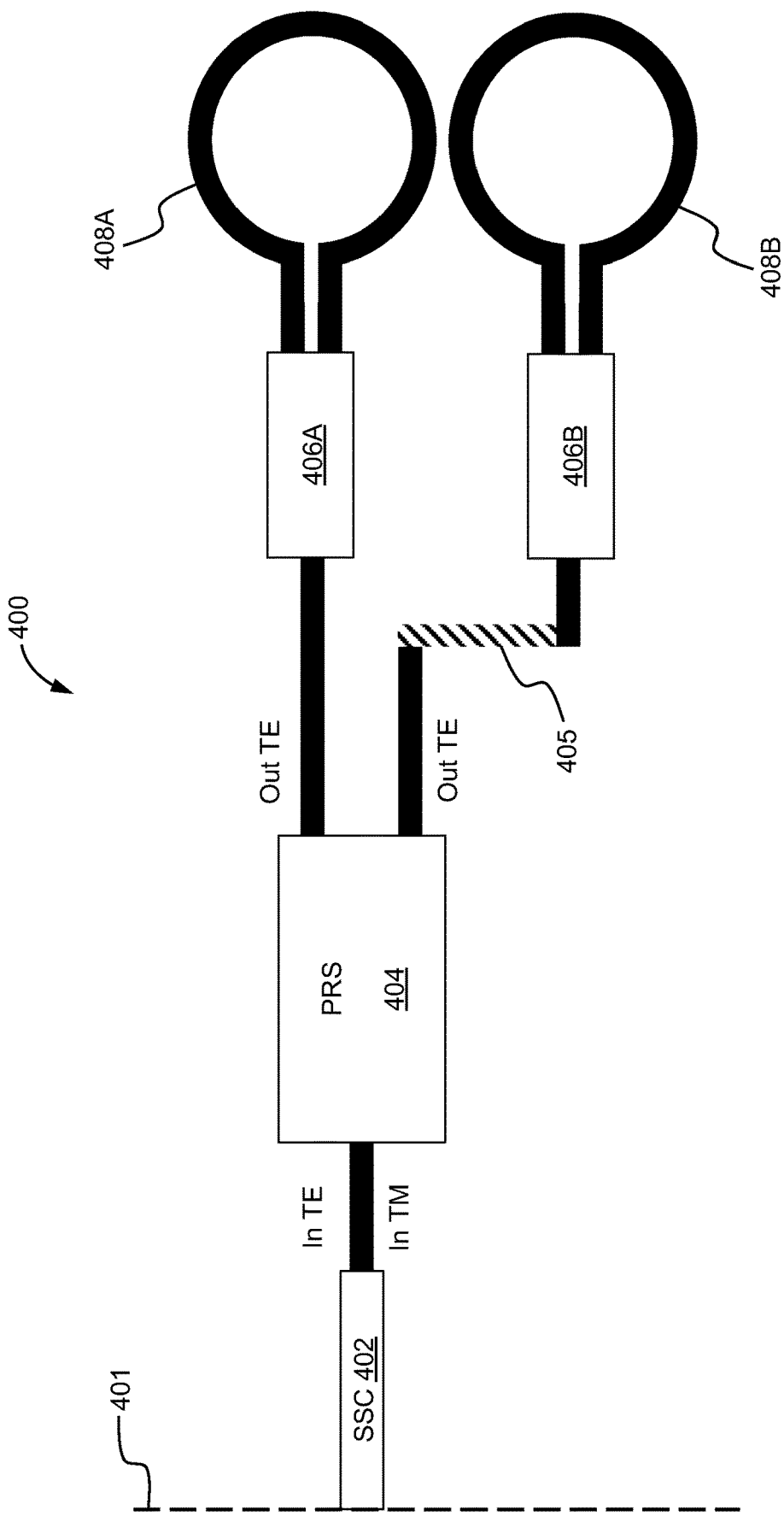
FIG. 4 is a schematic diagram of an example testing circuit.

Referring to FIG. 4, a testing circuit 400 is located on an integrated circuit for characterizing optical coupling characteristics (e.g., optical loss) associated with a SSC 402. In this example, the SSC 402 couples an optical wave at the edge 401 of the integrated circuit. The testing circuit 400 includes a polarization rotator splitter (PRS) 404. The testing circuit 400 also includes an optical splitter 406A which has an input port optically coupled to one of the output ports of the PRS 404. The testing circuit 400 also includes an optical splitter 406B which has an input port optically coupled to one of the output ports of the PRS 404. The testing circuit 400 also includes a delay line 405 in the optical path between the optical splitter 406B and the output port of the PRS 404 that it is optically coupled to. The optical splitter 406A has two output ports that are optically coupled to each other via a waveguide loop 408A. The waveguide loop 408A has a first end abutted against one output port of the optical splitter 406A and a second end abutted against the other output port of the optical splitter 406A. The optical splitter 406B has two output ports that are optically coupled to each other via a waveguide loop 408B. The waveguide loop 408B has a first end abutted against one output port of the optical splitter 406B and a second end abutted against the other output port of the optical splitter 406B.

The testing circuit 400 may be configured to enable characterization of the SSC 402 for a mixture of TE and TM polarization modes, enabling testing of TE and TM polarization mode characteristics in the same testing circuit 400. The optical output signal from the testing circuit 400 can have an interference pattern resulting from interference between the optical input and its reflection during a spectrum measurement. There may be no substantial interference between TE and TM polarizations when the input polarization is tuned to TE or TM only, but a maximum contrast in an interference pattern can be achieved if the input polarization is tuned to include substantially equal energies in the TE and TM polarization modes (e.g., using input light with a controlled input polarization, or input light with scrambled polarization). The interference pattern will show maxima and minima in the intensity of the optical output signal as the wavelength of the input light is scanned during the spectrum measurement, for example. The delay line 405 can provide an optical path difference between TE and TM polarization modes that determine a free spectral range for the interference pattern (i.e., a full period of the interference pattern), allowing for TE and TM polarization modes to be separately characterized based on the minimum and maximum amplitudes in the interference pattern and the contrast between them. Alternatively, the delay line 405 can create a time delay between the optical output signal of the TE mode and the optical output signal of the TM mode even without scanning of the input light wavelength, thus enabling separate characterization of the TE and TM polarization modes through the use of time-domain reflectometry (e.g., techniques that measure the arrival times of different reflected light pulses).

The delay line 405 may be produced with different delays to enable different characterizations. The delay line 405 may be produced to have a particular length that provides a particular delay based on a group index of the material used to form the delay line 405. An alternative design for the testing circuit 400 could instead include the delay line 405 in the optical path between the optical splitter 406A and the output port of the PRS 404 that it is optically coupled to, or respective delay lines having different delays in both optical paths.

Figure 5:
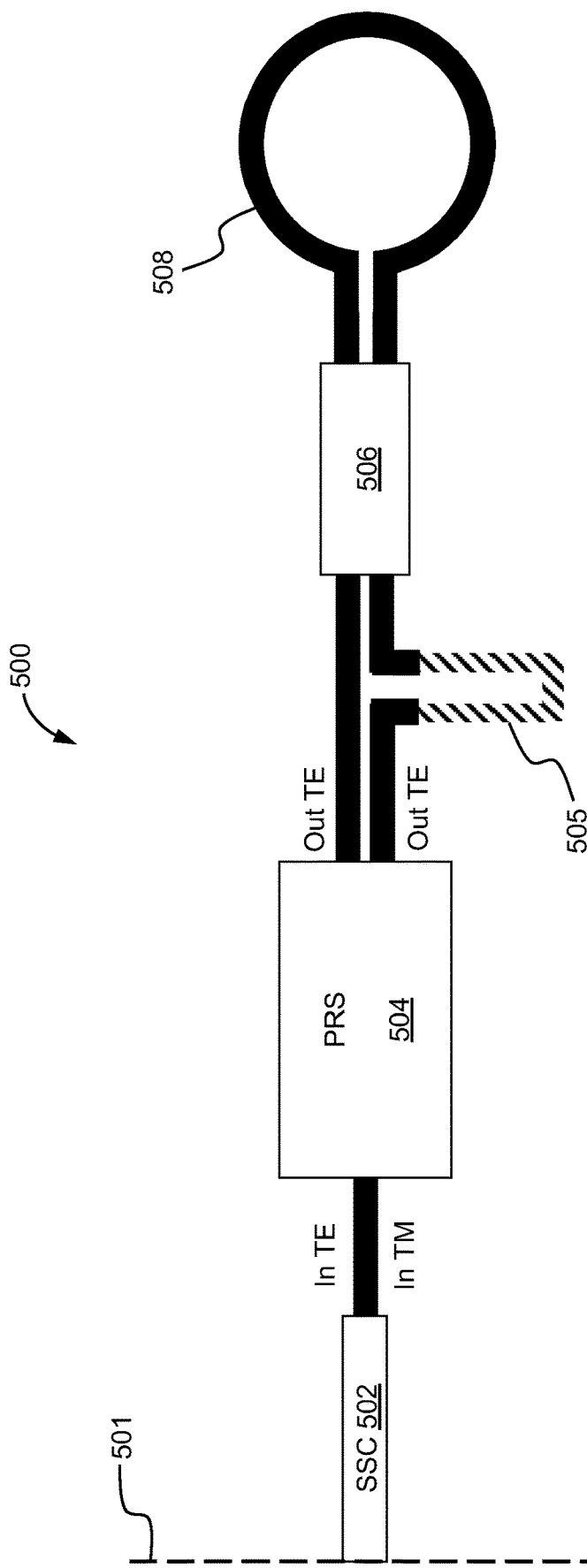
FIG. 5 is a schematic diagram of an example testing circuit.

Referring to FIG. 5, a testing circuit 500 is located on an integrated circuit for characterizing optical coupling characteristics (e.g., optical loss) associated with a SSC 502. In this example, the SSC 502 couples an optical wave at the edge 501 of the integrated circuit. The testing circuit 500 includes a polarization rotator splitter (PRS) 504. The testing circuit 500 also includes an optical splitter 506 which has two input ports optically coupled to different ones of the output ports of the PRS 504. The testing circuit 500 also includes a delay line 505 in one of the optical paths between an input port the optical splitter 506 and an output port of the PRS 504 that it is optically coupled to. The optical splitter 506 has two output ports that are optically coupled to each other via a waveguide loop 508. The waveguide loop 508 has a first end abutted against one output port of the optical splitter 506 and a second end abutted against the other output port of the optical splitter 506. In this example, the testing circuit 500 is configured to enable characterization of the SSC 502 for a mixture of TE and TM polarization modes in a similar manner as the testing circuit 400, but with a single loop reflector instead of the two independent loop reflectors of the testing circuit 400. One aspect of this example is that the optical splitter 506 is configured as a 2×2 coupler that splits an optical wave at either input port substantially evenly between the two output ports. Due to the internal phase shifts within the optical splitter 506 and time-reversibility of the optical propagation, light that enters the first input port is reflected back out of the first input port, and light that enters the second input port is reflected back out of the second input port.

Figure 6:
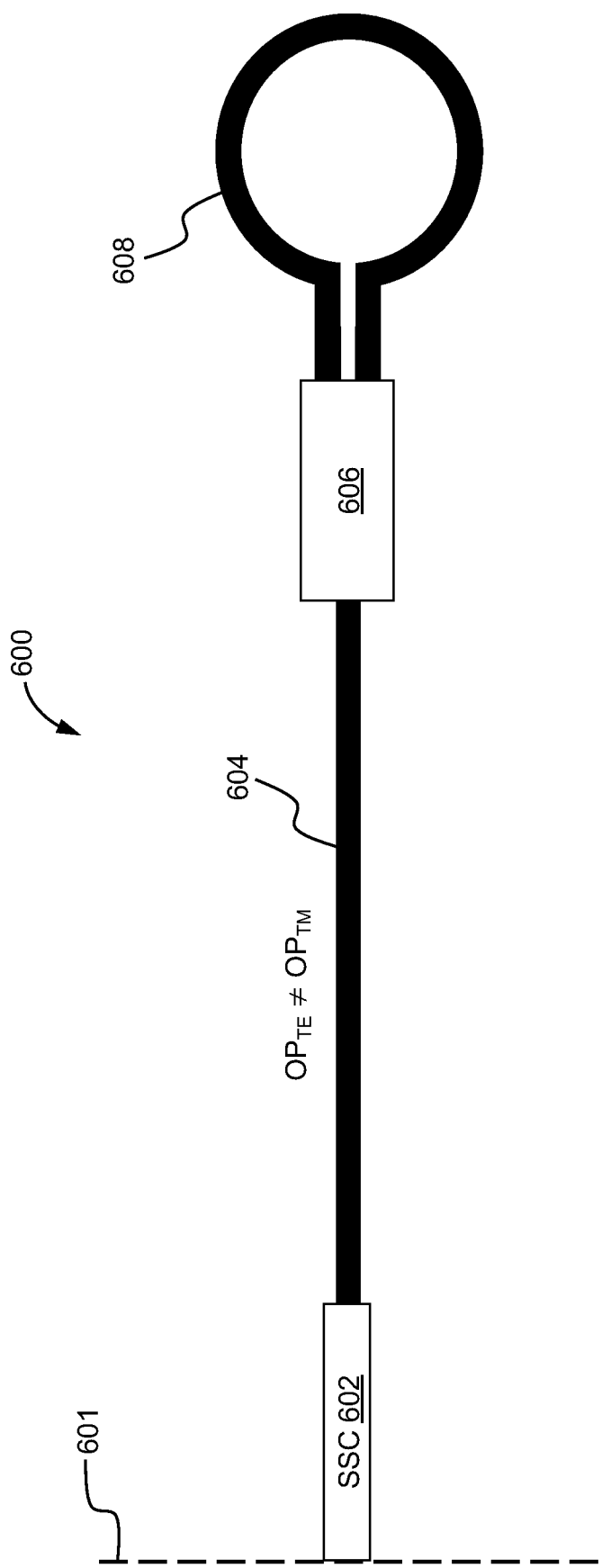
FIG. 6 is a schematic diagram of an example testing circuit.

Referring to FIG. 6, a testing circuit 600 is located on an integrated circuit for characterizing optical coupling characteristics (e.g., optical loss) associated with a SSC 602. In this example, the SSC 602 couples an optical wave at the edge 601 of the integrated circuit. The testing circuit 600 includes an optical splitter 606, which has an input port optically coupled to the SSC 602. The testing circuit 600 also includes a polarization-dependent optical waveguide 604 in the optical path between the optical splitter 606 and the SSC 602. The polarization-dependent optical waveguide 604 supports both TE and TM polarization modes, but the group index of each can be made to be different, such that the optical path length of the TE and the TM polarization modes are different. The optical splitter 606 has two output ports that are optically coupled to each other via a waveguide loop 608. The waveguide loop 608 has a first end abutted against one output port of the optical splitter 606 and a second end abutted against the other output port of the optical splitter 606. In this example, the optical splitter 606 and waveguide loop 608 are both configured to provide even splitting and low loss operation for both polarization modes in a polarization-independent manner forming a polarization-independent loop reflector, with polarization dependence being provided by the optical waveguide 604. So, in this example, the different optical path lengths provided by the polarization-dependent optical waveguide 604 provides different time delays for different polarization modes without requiring additional delay lines. Alternatively, other implementations can include polarization dependence in all of the optical waveguide 604, the optical splitter 606, and waveguide loop 608.

Figure 7:
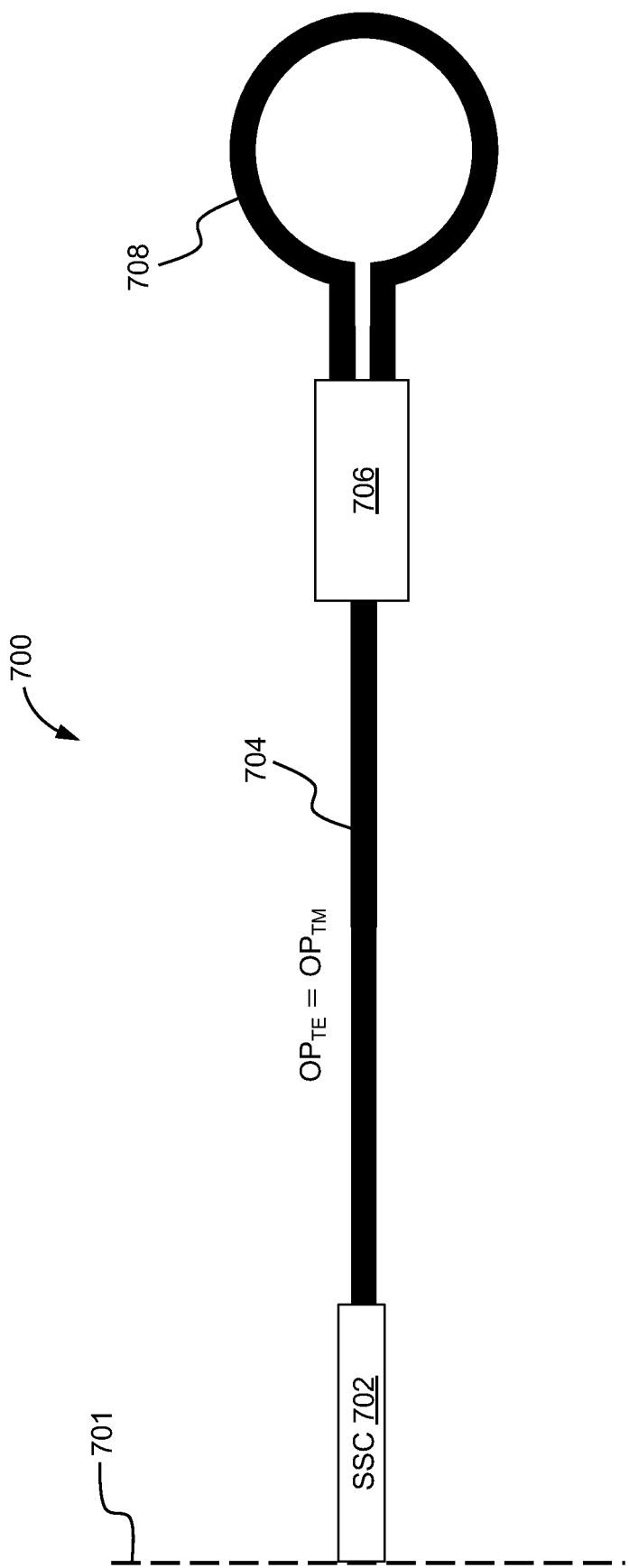
FIG. 7 is a schematic diagram of an example testing circuit.

Referring to FIG. 7, a testing circuit 700 is located on an integrated circuit for characterizing optical coupling characteristics (e.g., optical loss) associated with a SSC 702. In this example, the SSC 702 couples an optical wave at the edge 701 of the integrated circuit. The testing circuit 700 includes an optical splitter 706, which has an input port optically coupled to the SSC 702. The testing circuit 700 also includes a polarization-independent optical waveguide 704 in the optical path between the optical splitter 706 and the SSC 702. The polarization-independent optical waveguide 704 supports both TE and TM polarization modes, where the group index of each polarization mode can be made to be similar, such that the optical path length of the TE and the TM polarization modes are similar. The optical splitter 706 has two output ports that are optically coupled to each other via a waveguide loop 708. The waveguide loop 708 has a first end abutted against one output port of the optical splitter 706 and a second end abutted against the other output port of the optical splitter 706.

In the example of FIG. 7, the optical splitter 706 and/or the waveguide loop 708 can be polarization-dependent. One example of polarization dependence may be unequal optical path lengths of TE and TM polarization modes. In this example, the testing circuit 700 is configured to enable characterization of the SSC 702 for a mixture of TE and TM polarization modes as described above.

Figure 8:
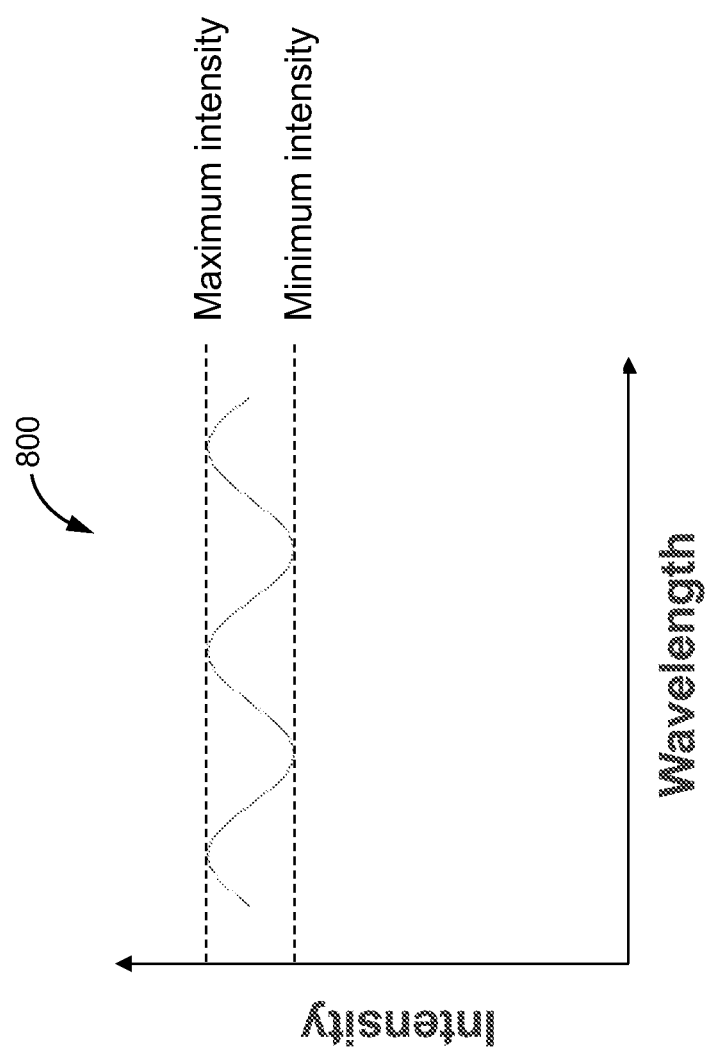
FIG. 8 is a plot of an example interference pattern.

In the examples of FIGS. 4-7, testing circuits 400, 500, 600, and 700 are able to characterize both TE and TM polarized modes. Since TE and TM polarized modes can have different optical losses within the testing circuits 400, 500, 600, and 700 for different optical wavelengths, the reflected optical power from a given testing circuit can indicate the different optical characteristics of the respective SSCs 402, 502, 602, and 702 for different polarization modes. The testing circuits 400, 500, 600, and 700 allow for interference effects between the optical input and its reflection, resulting in optical intensity extrema corresponding to TE and TM polarization modes as the wavelength of the input light is scanned. The input polarization may be tuned to provide a desired contrast (e.g., a maximum contrast) in the minimum and maximum of the optical intensity of the interference pattern. FIG. 8 shows a plot for a prophetic example of an interference pattern 800 measured by the testing system 120 by scanning the wavelength of the light from the light source 126. The wavelength scan results in maximum and minimum intensity levels in the interference pattern 800 that can be associated with the TE and TM polarization modes. By selecting the appropriate delay between the propagation paths for light in the TE and TM polarization modes at the input, and calculating the free-spectral range (FSR) corresponding to a period of the spectrum 800, the testing system 120 can provide measurements of the optical characteristics, or data from what the optical characteristics can be derived. The input polarization can also be controlled using the polarization controller 132 to maximize or minimize light detected at power meter 128.

For example, the testing system 120 can be configured with one or more tunable polarization controllers to generate data based on a Mueller polarization matrix (e.g., 1st-row data) to extract desired polarization-based information using a wavelength scan to generate the interference pattern. Maximum polarization, minimum polarization and polarization dependent loss can then be identified with proper analysis of the Mueller matrix and Stokes vectors.

Alternative testing systems can be used, such as a testing system configured as an optical vector analyzer. In some implementations, it can be beneficial to adjust the extra delay line of the hybrid configurations (e.g., delay lines 405 and 505) to make sure that the responses in time domain associated with the TE polarization mode and TM polarization mode are well resolved. For example, having TE and TM polarization mode responses separated in time would allow the possibility of filtering the TE polarization mode independently from TM polarization mode and extract directly the independent coupling losses associated with the TE and TM polarization modes.

Figure 9:
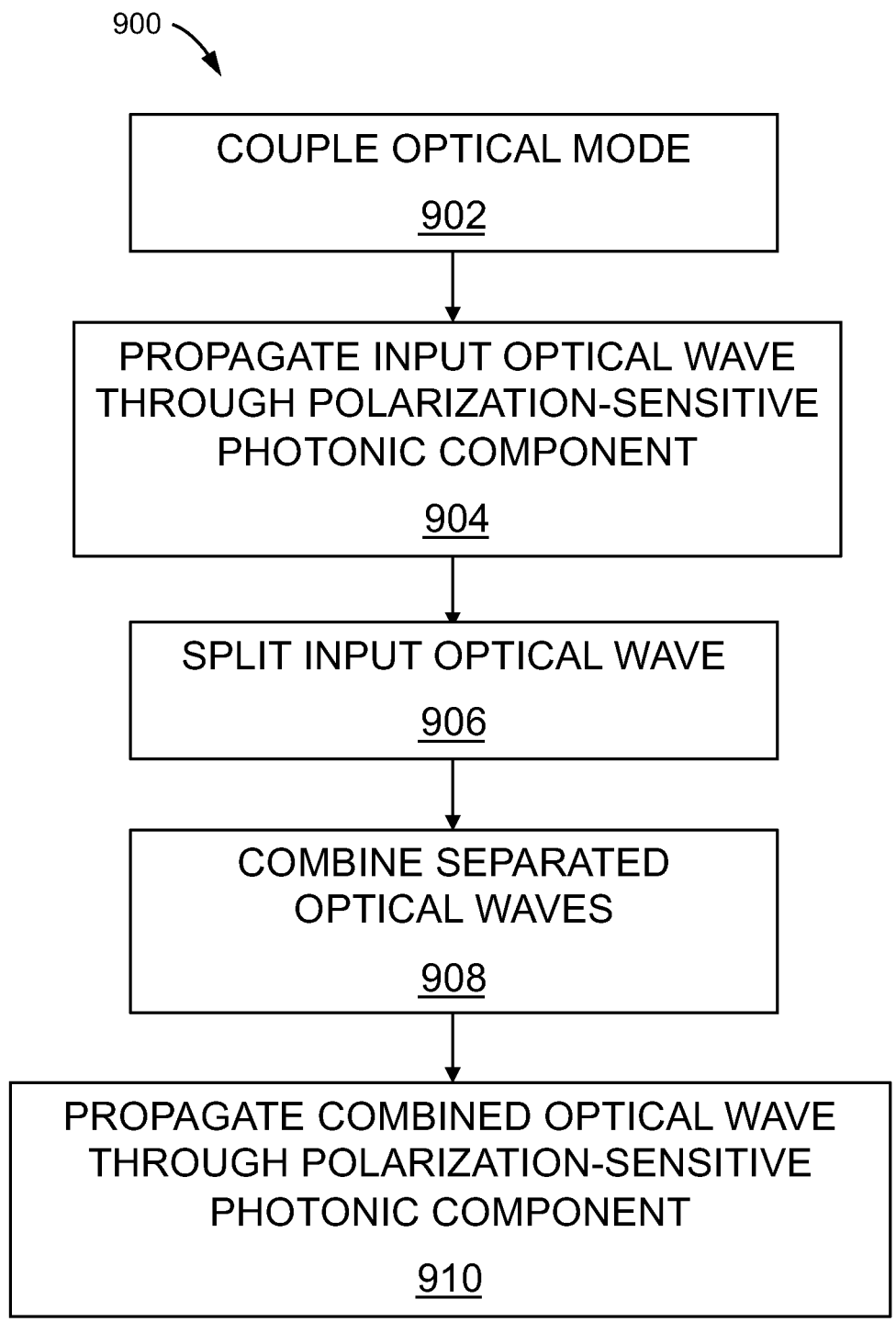
FIG. 9 is a flowchart of an example testing procedure.

FIG. 9 shows a flowchart for an example testing procedure 900 for characterizing a first optical coupler in an integrated circuit that is optically coupled to a first integrated circuit portion. The procedure 900 includes coupling (902) an optical mode of an input optical wave into a second optical coupler in the integrated circuit having an identical structure to the first optical coupler, where the second optical coupler is optically coupled to a second photonic integrated circuit portion and is optically uncoupled to the first photonic integrated circuit portion. The procedure 900 includes propagating (904) the input optical wave through a polarization-sensitive photonic component. The procedure 900 includes, after propagating through the polarization-sensitive photonic component, splitting (906) the input optical wave into first and second separated optical waves. The procedure 900 includes combining (908) the first and second separated optical waves into a combined optical wave. The procedure 900 includes propagating (910) the combined optical wave through the polarization-sensitive photonic component.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. An integrated circuit comprising:
   one or more photonic layers that include a plurality of photonic integrated circuit portions;
   a first optical coupler configured to couple an optical mode of an optical wave to a first photonic integrated circuit portion in the one or more photonic layers; and
   a second optical coupler configured to couple an optical mode of an optical wave to a second photonic integrated circuit portion that is optically uncoupled to the first photonic integrated circuit portion, the second photonic integrated circuit portion comprising
      a polarization-sensitive photonic component that is configured to receive a first mode that has a transverse magnetic (TM) polarization and to couple the first mode over a first optical path length to a port within the second photonic integrated circuit portion, and is configured to receive a second mode that has a transverse electric (TE) polarization and to couple the second mode over a second optical path length to a different port within the second photonic integrated circuit portion, where a difference between the first optical path length and the second optical path length is configured to increase a delay between the first mode and the second mode, and
      an optical splitter comprising at least one input port optically coupled to the polarization-sensitive photonic component and at least two output ports including a first output port and a second output port;
   where the first output port and the second output port are optically coupled to each other, and the second photonic integrated circuit portion comprises a loop reflector that comprises the optical splitter and an optical waveguide that has a first end abutted against the first output port and a second end abutted against the second output port.

2. The integrated circuit of claim 1, where the polarization-sensitive photonic component comprises an optical waveguide configured to support a first mode that has a first effective refractive index for a transverse electric polarization and a second mode that has a second effective refractive index for a transverse magnetic polarization, and where the second effective refractive index is different from the first effective refractive index.

3. The integrated circuit of claim 1, where the polarization-sensitive photonic component comprises a polarization rotator splitter (PRS) that comprises a PRS input port optically coupled to the second optical coupler, and a first PRS output port coupled to the input port of the optical splitter.

4. The integrated circuit of claim 3, where the PRS is configured to support the first mode at the PRS input port and the second mode at the first PRS output port, and the PRS is configured to propagate over 90% of energy in the first mode at the PRS input port to the first PRS output port.

5. The integrated circuit of claim 4, where the PRS comprises a second PRS output port and is configured to support a third mode at the PRS input port that has a TE polarization and a fourth mode at the second PRS output port that has a TE polarization, and the PRS is configured to propagate over 90% of energy in the third mode at the PRS input port to the second PRS output port.

6. The integrated circuit of claim 5, where the first PRS output port is coupled over the first optical path length to the optical splitter that is part of a first loop reflector, and the second PRS output port is coupled over the second optical path length to a second optical splitter that is part of a second loop reflector.

7. The integrated circuit of claim 5, where the first PRS output port is coupled over the first optical path length to a first input port of the optical splitter that is part of a loop reflector, and the second PRS output port is coupled over the second optical path length to a second input port of the optical splitter.

8. The integrated circuit of claim 3, where the PRS is configured to support a first mode at the PRS input port that has a transverse electric (TE) polarization and a second mode at the first PRS output port that has a transverse electric (TE) polarization, and the PRS is configured to propagate over 90% of energy in the first mode at the PRS input port to the first PRS output port.

9. The integrated circuit of claim 1, where the first optical coupler comprises a first spot-size converter configured to change a size of an optical mode of an optical wave propagating through the first spot-size converter, and the second optical coupler comprises a second spot-size converter configured to change a size of an optical mode of an optical wave propagating through the second spot-size converter, where each of the first spot-size converter and the second spot-size converter is characterized by polarization dependent loss, and the first spot-size converter and the second spot-size converter have identical structure.

10. The integrated circuit of claim 1, where the first optical coupler and the second optical coupler are in the same photonic layer of the one or more photonic layers.

* * * * *